US009902521B2

United States Patent
Moliski et al.

(10) Patent No.: US 9,902,521 B2
(45) Date of Patent: Feb. 27, 2018

(54) MANUAL SONIC WELDING MACHINE

(71) Applicant: Avery Dennison Corporation, Pasadena, CA (US)

(72) Inventors: John W. Moliski, Sayre, PA (US); Christopher T. Caldwell, Lenoir, SC (US); Derrick Harrison, Lenoir, SC (US); Robert Glavin, Miamisburg, OH (US)

(73) Assignee: AVERY DENNISON RETAIL INFORMATION SERVICES, LLC, Mentor, OH (US)

( * ) Notice: Subject to any disclaimer, the term of this patent is extended or adjusted under 35 U.S.C. 154(b) by 199 days.

(21) Appl. No.: 13/678,178

(22) Filed: Nov. 15, 2012

(65) Prior Publication Data
US 2013/0122235 A1 May 16, 2013

Related U.S. Application Data

(60) Provisional application No. 61/559,913, filed on Nov. 15, 2011.

(51) Int. Cl.
*B32B 37/00* (2006.01)
*B65C 9/00* (2006.01)
(Continued)

(52) U.S. Cl.
CPC ............... *B65C 9/00* (2013.01); *B29C 65/08* (2013.01); *B29C 65/76* (2013.01);
(Continued)

(58) Field of Classification Search
CPC .. B65C 9/00; B65C 5/00; B29C 65/76; B29C 65/7835; B29C 65/08; B42F 5/00
(Continued)

(56) References Cited

U.S. PATENT DOCUMENTS 2,752,703 A 7/1956 Halperin
3,647,599 A 3/1972 Gardner
(Continued)

FOREIGN PATENT DOCUMENTS

EP 0032703 7/1981
EP 0081690 A1 6/1983
(Continued)

OTHER PUBLICATIONS

International Search Report and Written Opinion dated Jan. 30, 2015 for International Application No. PCT/US2012/065280.
(Continued)

*Primary Examiner* — James Sells
(74) *Attorney, Agent, or Firm* — Avery Dennison Retail Information Services, LLC

(57) ABSTRACT

A system and method is presented that provides a manual sonic welding device for welding multiple labels or other articles together. The manual sonic welding device includes an anvil and a head. The anvil is where the labels are placed on the welding device and allows the high frequency vibration from the welding device to be directed to the proper interfaces of the labels. The head allows the multiple labels to be assembled under pressure. Additionally, the manual sonic welding device includes a converter, a sonic horn, and a power supply to seal the multiple labels together. The power supply delivers a high power AC signal, the converter converts the electrical signal into a mechanical vibration, and the sonic horn applies the mechanical vibration to the labels to be welded. The manual sonic welding device also includes dual safety switches which activate the device.

11 Claims, 4 Drawing Sheets

(51) Int. Cl.
    *B65C 5/00*          (2006.01)
    *B32B 7/04*          (2006.01)
    *B29C 65/08*        (2006.01)
    *B29C 65/76*        (2006.01)
    *B29C 65/78*        (2006.01)
    *B29C 65/00*        (2006.01)
    *B42F 5/00*          (2006.01)
    *G09F 3/02*          (2006.01)
    *G09F 3/00*          (2006.01)
    *G09F 3/04*          (2006.01)
    *G09F 3/08*          (2006.01)
    *B29L 31/00*        (2006.01)

(52) U.S. Cl.
CPC ...... *B29C 65/7835* (2013.01); *B29C 66/1122* (2013.01); *B29C 66/43* (2013.01); *B29C 66/8161* (2013.01); *B29C 66/81433* (2013.01); *B29C 66/8242* (2013.01); *B29C 66/8322* (2013.01); *B29C 66/8742* (2013.01); *B29C 66/9221* (2013.01); *B29C 66/9241* (2013.01); *B32B 7/045* (2013.01); *B42F 5/00* (2013.01); *B65C 5/00* (2013.01); *G09F 3/02* (2013.01); *G09F 3/0288* (2013.01); *G09F 3/04* (2013.01); *G09F 3/08* (2013.01); *B29C 65/081* (2013.01); *B29C 66/21* (2013.01); *B29C 66/71* (2013.01); *B29C 66/729* (2013.01); *B29C 66/7294* (2013.01); *B29C 66/73921* (2013.01); *B29C 66/929* (2013.01); *B29C 66/949* (2013.01); *B29C 66/9513* (2013.01); *B29L 2031/744* (2013.01); *Y10T 428/19* (2015.01)

(58) Field of Classification Search
USPC .................. 156/73.1, 580.1, 580.2
See application file for complete search history.

(56) References Cited

U.S. PATENT DOCUMENTS

| | | | | |
|---|---|---|---|---|
| 3,813,021 A | * | 5/1974 | Kramer | B23K 20/10 192/131 R |
| 4,313,778 A | * | 2/1982 | Mims | B29C 65/08 156/358 |
| 4,500,372 A | * | 2/1985 | Mion | B26D 7/086 156/251 |
| 6,309,490 B1 | * | 10/2001 | Davis | B29C 65/08 156/251 |
| 7,681,378 B2 | * | 3/2010 | Brormann | B29C 65/08 156/580.1 |
| 8,096,339 B2 | * | 1/2012 | Aust | B29C 65/08 156/351 |
| 2008/0263919 A1 | | 10/2008 | Halliday | |
| 2011/0108184 A1 | * | 5/2011 | Cai | B23K 20/10 156/73.5 |

FOREIGN PATENT DOCUMENTS

| | | |
|---|---|---|
| EP | 0786323 | 7/1997 |
| FR | 22057652 A1 | 5/1974 |
| JP | 2008156424 | 7/2008 |

OTHER PUBLICATIONS

International Search Report and Written Opinion Prepared for PCT/US2017/028557 dated Jul. 21, 2017.

* cited by examiner

MANUAL SONIC WELDING MACHINE

CROSS-REFERENCE TO RELATED APPLICATION

The present application claims the benefit of U.S. Provisional Patent Application No. 61/559,913 filed Nov. 15, 2011, which is incorporated herein by reference in its entirety.

BACKGROUND

Product labels play an important role in educating a user, such as a consumer, about a particular product and are well known in the art. Oftentimes it is necessary to attach multiple labels to a product, or include multiple labels within the product packaging. For example, sewing contractors, sewing operators, and other users typically sew multiple labels and other articles simultaneously into a garment. However, it is difficult to keep the multiple labels or other articles aligned, which results in a decrease to their production capabilities. Additionally, multiple labels are difficult to handle at one time resulting in continuous adjustment and rearrangement of the position and alignment of the labels, and a decrease in sewing speed. Furthermore, if the labels are aligned and bonded together, it would allow more room to print language translations, care instructions, material content, etc. Therefore, there is a continuing need for a device that can align and bond together multiple labels for the ease of placement in a garment during the sew-in process.

The present invention discloses a manual sonic welding device that welds multiple labels together into one packet or stack and a method for welding at least two labels together. The label packet will be aligned and easy to handle for the sewing contractor or operator, and will increase sewing speed as well. The weld will hold the multiple labels together and keep the labels aligned during the sewing operation. The weld can be adjusted for strength such that the top and bottom label can be torn off without destroying the other labels. Thus, the welding device will allow users to install a label packet into a garment without having to continuously adjust and rearrange the position and alignment of the labels.

SUMMARY OF THE INVENTION

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

The subject matter disclosed and claimed herein, in one aspect thereof, describes a manual sonic welding device for welding multiple labels or other articles together using ultrasonic welding and a knurled head. The manual sonic welding device has an anvil and a head. The anvil is where the labels or other articles are placed on the welding device and allows the high frequency vibration from the welding device to be directed to the proper interfaces of the labels or other articles. The head allows the multiple labels or other articles to be assembled under pressure. Additionally, the manual sonic welding device includes a converter, a sonic horn or sonotrode and a power supply to seal the multiple labels together via ultrasonic welding. The power supply delivers a high power AC signal with frequency matching the resonance frequency of the converter and sonic horn. The converter converts the electrical signal into a mechanical vibration, and the sonic horn applies the mechanical vibration to the labels to be welded. The manual sonic welding device also comprises dual safety switches which activate the device. Specifically, a user places both hands on the switches and simultaneously presses and depresses the switches to activate the weld function.

In a preferred embodiment, the pressure of the head can be controlled pneumatically. A user can utilize an air cylinder which will drive the head downward against the labels. The air cylinder is controlled by a solenoid valve, and the user can adjust the air pressure of the air cylinder via an air pressure gauge and other controls as is known in the art. Users can also adjust the pressure of the head via manually adjusting a nut pressure control, which influences the strength of the weld.

Another aspect of the current invention describes a method of removably attaching at least one label to a second label. The method of removably attaching at least one label to a second at least one label includes the steps of initially positioning at least one label and a second at least one label on an anvil. Next, pressure is applied to the at least one label and the second at least one label. A received electrical signal is converted into a mechanical vibration; and then utilizing a sonic horn to apply the mechanical vibration to at least one of said at least one label and said second at least one label.

The current invention also discloses a plurality of labels that are welded by the sonic welding device disclosed above. The plurality of labels can include at least one of the following materials: fabric, thermoplastic material, acrylic, nylon, polyester, polyethylene terephalate. At least one side of at least one label of the plurality of labels can contain indicia. In an exemplary embodiment, the labels are welded such that the top or bottom label can be peeled or torn off without significantly damaging the labels below or above the label being removed, but the welding is strong enough to keep the labels adhered together during repeated washings or dry cleanings.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION OF THE INVENTION

Figure 1:
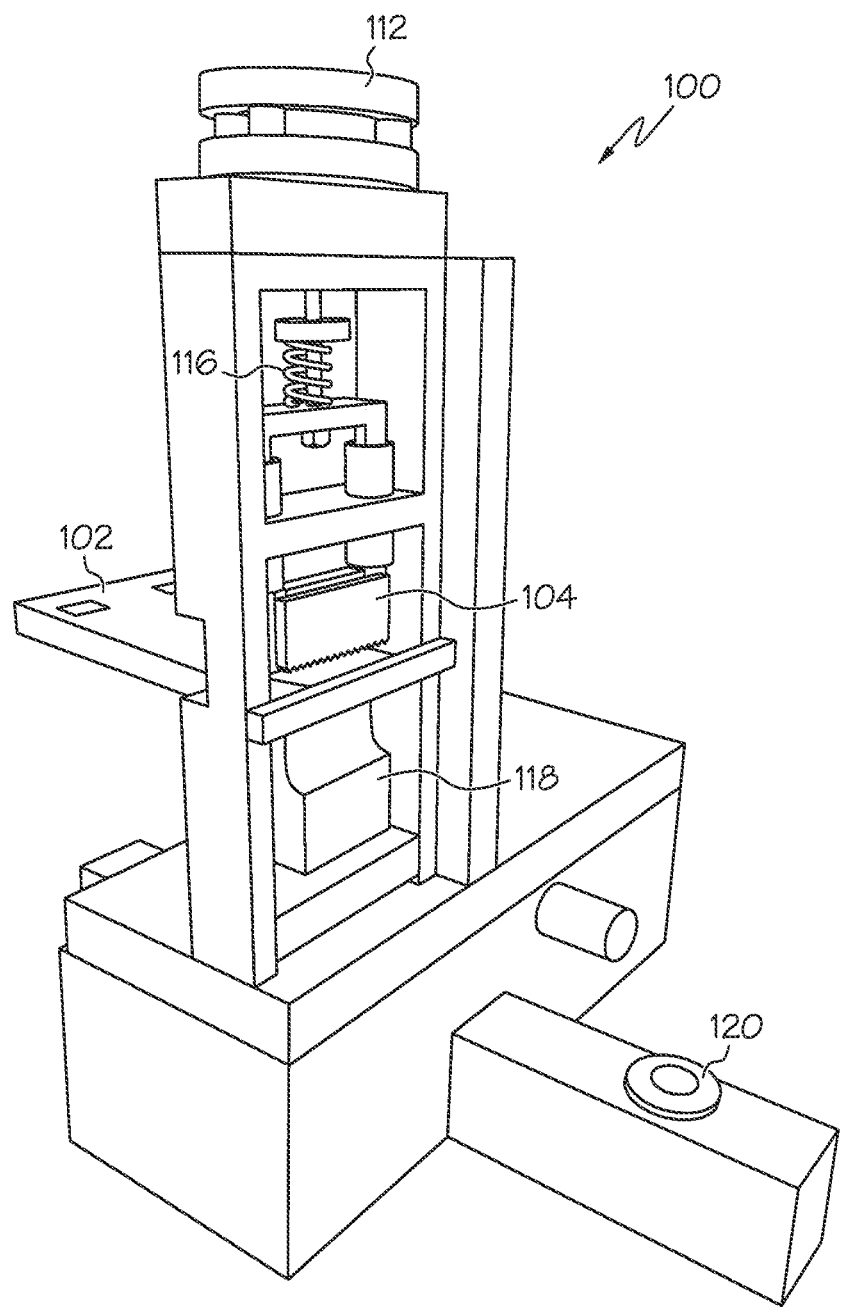
FIG. 1 illustrates a perspective view of a manual sonic welding device in accordance with the disclosed architecture.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof.

The present invention discloses a manual sonic welding device that welds multiple labels together into one packet or stack. The weld will hold the multiple labels together and keep the labels aligned during the sewing operation. The weld can be adjusted for strength such that the top and bottom label can be torn off without destroying the other labels. Further, the welding device allows a user to place multiple labels in a desired order on the device, and to activate the device by pressing dual switches. Once the weld function is complete, the labels will be joined perfectly straight and aligned in a single packet, ready for the sew-in process.

Figure 2:
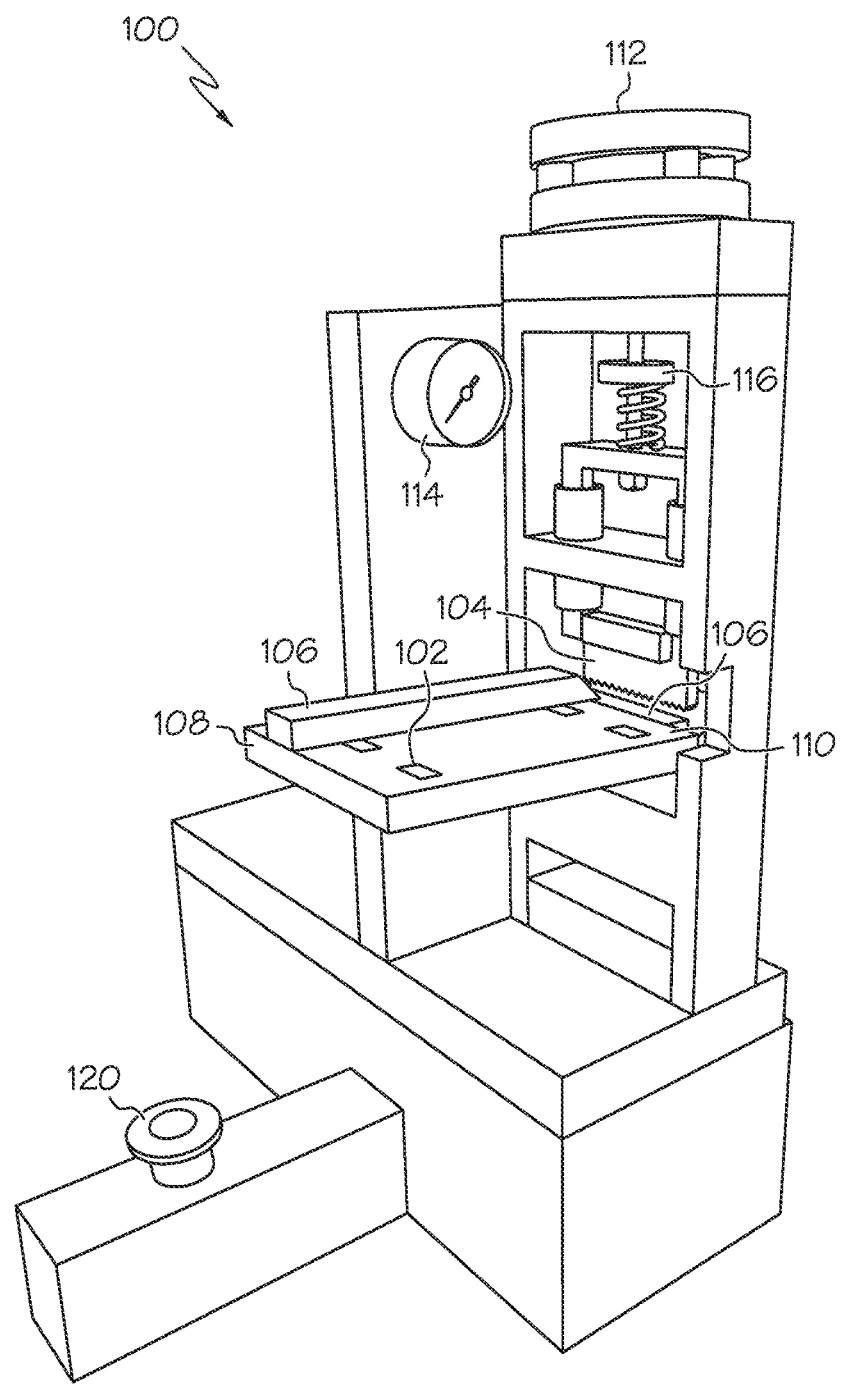
FIG. 2 illustrates a perspective view of a manual sonic welding device in accordance with the disclosed architecture.

Referring initially to the drawings, FIGS. 1 and 2 illustrate a manual sonic welding device 100 for welding multiple labels or other articles together using ultrasonic welding and a knurled head. The manual sonic welding device 100 comprises an anvil 102 and a head or press 104. The anvil 102 is where the labels or other articles are placed on the welding device 100 and allows the high frequency vibration from the welding device 100 to be directed to the proper interfaces of the labels or other articles being joined. In a preferred embodiment, the anvil 102 further comprises adjustable fencing 106 that aligns the labels or other articles and provides for proper stacking prior to welding. The adjustable fencing 106 can be positioned on at least one side 108 and/or a back 110 of the anvil 102 as shown in FIG. 2. The fencing 106 can be fixed as opposed to adjustable, or a section of fencing 106 can be fixed and another section of fencing 106 can be adjustable, depending on the size and shape of the labels or other articles to be welded.

Further, the manual sonic welding device 100 includes a head or press 104. The head or press 104 allows the multiple labels or other articles to be assembled under pressure. Typically, the head 104 is knurled or textured which influences the strength of the weld and helps to secure the labels or other articles in place on the anvil 102. Furthermore, pressure of the head 104 can be controlled pneumatically. A user can utilize an air cylinder 112 which will drive the head 104 downward against the labels. Typically, the air cylinder 112 is controlled by a solenoid valve (not shown) or any other suitable device as is known in the art. The welding device 100 has an input voltage to the solenoid valve of approximately between 100 to 120 Volts. The user can adjust the air pressure of the air cylinder 112 via an air pressure gauge 114 and other controls as is known in the art. Users can also adjust the pressure of the head 104 via manually adjusting a nut pressure control 116, which influences the strength of the weld. Typically, the welding device 100 utilizes approximately 60 to 100 psi (pounds per square inch) input air pressure for air cylinder operation. Notwithstanding, it is contemplated that other known systems, such as hydraulic pressure systems, could also be used without affecting the overall concept of the present invention.

The manual sonic welding device 100 also includes a converter (not shown), a sonic horn or sonotrode 118 and a power supply to seal the multiple labels together via ultrasonic welding. The converter and the sonic horn 118 are specifically tuned to resonate at the same ultrasonic frequency, such as approximately 20, 30, 35 or 40 kHz (kilohertz). The power supply or electronic ultrasonic generator delivers a high power AC signal with frequency matching the resonance frequency of the converter and sonic horn 118. The converter converts the electrical signal into a mechanical vibration.

The sonic horn 118 applies the high-frequency, mechanical vibrations to the labels to be welded. The sonic horn 118 operates perpendicular to the labels and fuses the labels together in the pattern of the stationary anvil 102. Specifically, welding occurs as the result of heat generated at the interface between the surfaces of the labels. The ultrasonic energy melts the point of contact between the labels, which creates a bond or weld when cool. Welding times can vary, but typically the welds are formed in approximately between 0.25 to 0.5 seconds. Further, the sonic horn 118 requires an input voltage of approximately between 207 to 253 Volts for ultrasonic power. Typically, the sonic horn 118 outputs approximately 36 to kHz and approximately between 500 to 1200 Watts.

Furthermore, the manual sonic welding device 100 can include at least one safety switch to activate/deactivate the device. In an exemplary embodiment, the sonic welding device utilizes dual safety switches 120 which serve to activate/deactivate the device. Specifically, a user places both hands on the switches, the left hand on the left switch and the right hand on the right switch of the welding device 100. By pressing and depressing the switches 120 simultaneously the welding device 100 will activate and complete the weld function. The use of two switches 120 also reduces the likelihood that a user's hands or arms will become injured during operation of the welding device 100.

Figure 3:
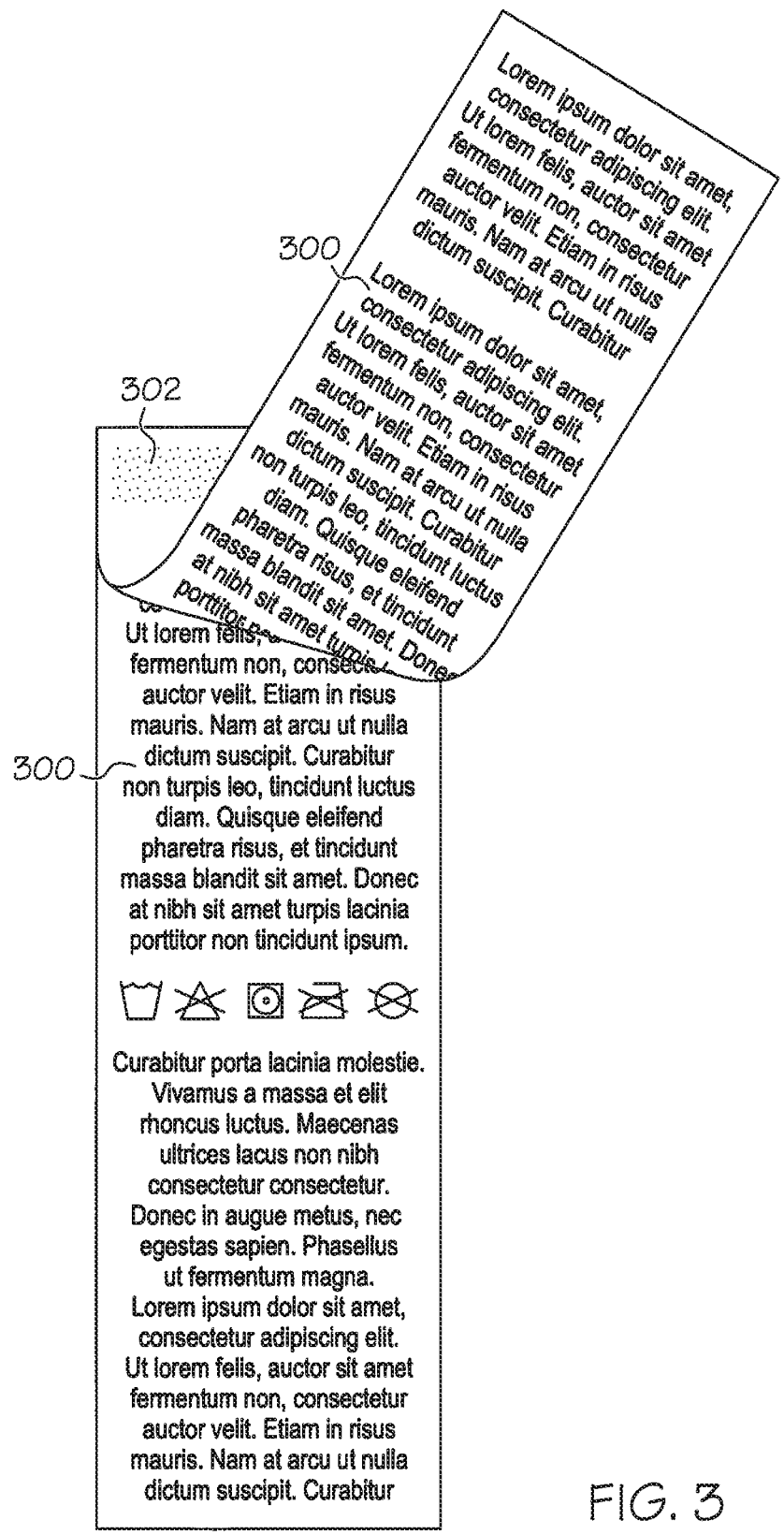
FIG. 3 illustrates a perspective view of a stack of labels welded together via the manual sonic welding device in accordance with the disclosed architecture.

FIG. 3 illustrates an exemplary embodiment of multiple labels 300 welded together using the manual sonic welding device (shown in FIGS. 1-2). The labels 300 or other articles used with the manual sonic welding device are typically made of fabric (either woven or non-woven), thermoplastic material or a film-like material, such as acrylic, nylon, polyester, polyethylene terephthalate (PET), etc. which is essentially unreceptive to colored dyes. However, any other suitable material can be used as is known in the art for ultrasonic welding, without affecting the overall concept of the invention. Typically, the labels 300 are utilized on a fabric garment, such as a shirt, shorts, pants, etc. However, the labels 300 can be attached to substrates other than garments without affecting the overall concept of the invention. Further, both sides of each of the labels 300 can bear indicia, either printed or woven. The printing can be done before or after welding the labels together. In a preferred embodiment, the labels are printed on before welding together.

The weld 302 produced by manual sonic welding device 100 adheres the labels 300 together, and can be adjusted for strength such that the top or bottom layers can be peeled or torn off without significantly damaging the labels below or above the label being removed. Specifically, the labels 300 are shown to be generally rectangular and to be separately releasably adhered together by the weld 302. The labels; however, can be any shape suitable for the intended purpose. The labels are also shown to be generally the same shape in FIG. 3; however, there may be a variation in shape and size amongst the labels. The connection of the labels 300 via the weld 302 is preferably strong enough to keep the labels adhered together during repeated washings or dry cleanings, yet the weld is weak enough so that either one or multiple labels 300 can be manually pulled or stripped away from the stack without destroying the other labels of the stack, or the garment or product bearing the labels.

Figure 4:
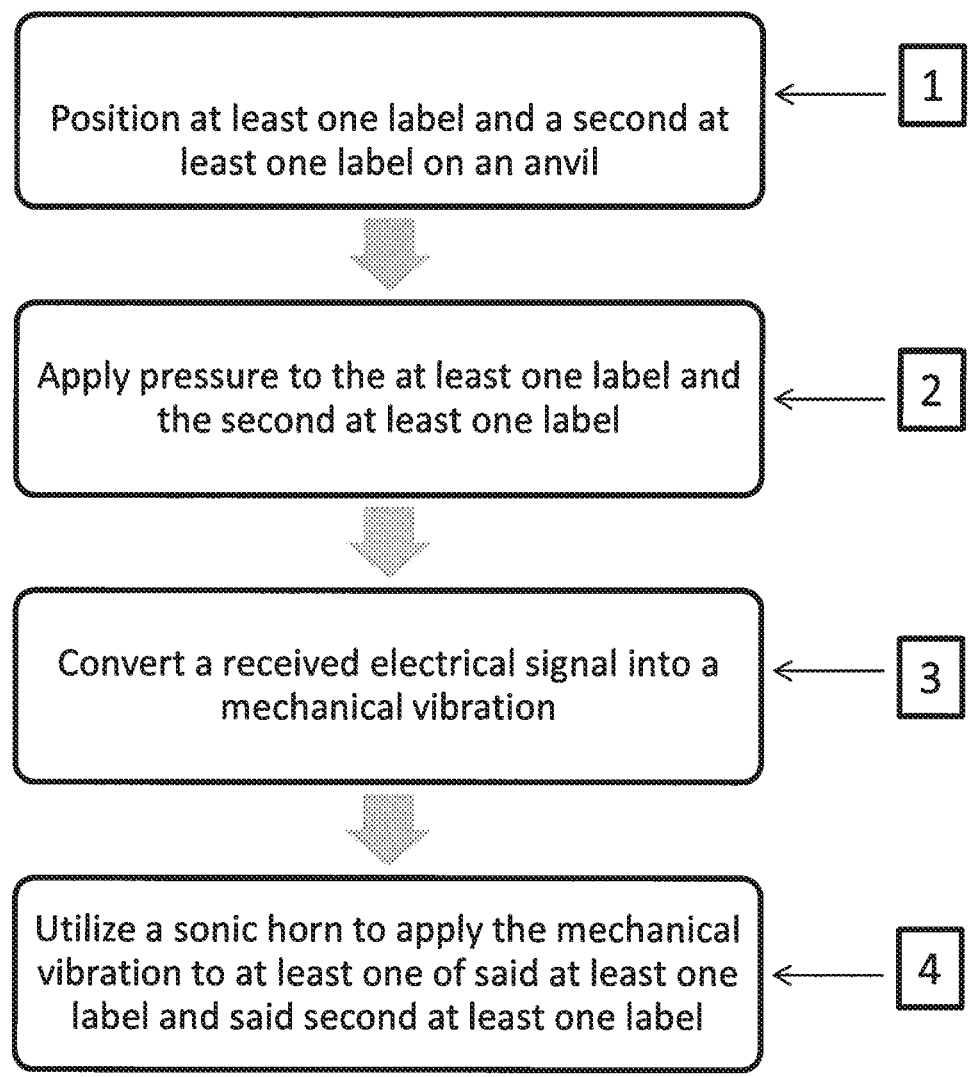
FIG. 4 illustrates a flow diagram of a method of removably attaching at least one label to a second at least one label.

Now that the structure and configuration of the manual sonic welding device has been generally described, its operation will be discussed. FIG. 4 shows a flow diagram of a method of removably attaching at least one label to a second at least one label. In preparation to operate one embodiment of the manual sonic welding device of the present invention, a user places individual multiple labels in a desired order to be joined as one stack for ease of placement in a garment or other product during the sew-in process. The user then places the labels, at Step 1, in their desired order on the anvil 102 of the welding device 100. Specifically, the user places the labels against the adjustable fencing or stop 106 on the back 110 of the anvil 102 and against the fixed fencing or stop 106 on the side 108 of the anvil 102, which keeps the stack of labels aligned. In one embodiment, the user then places one or both hands on the at least one safety switch. In an exemplary embodiment, the device has dual safety switches 120. Preferably the left hand on the left switch and the right hand on the right switch, and presses and depresses simultaneously both switches 120. Step 2, applying pressure to the at least one label and the second at least one label, is accomplished by pressing the dual safety switches 120, which energizes the solenoid valve (not shown), which will charge the air cylinder 112 and drive the knurled head or press 104 downward in the direction of the sonic horn or sonotrode 118, thereby sandwiching the labels between the head 104 and the sonic horn 118.

Next, at Step 3, the converter converts the electrical signal into a mechanical vibration. The sonic horn 118 then applies mechanical vibrations to the labels being welded at Step 4. The vibrations preferably move less than a millimeter either up-and-down or side-to-side. The frequencies used in ultrasonic welding are approximately between 15 to 70 kHz. The ultrasonic welding of thermoplastics causes local melting of the plastic due to absorption of vibrational energy from the sonic horn. Specifically, the vibrations are generally perpendicular to the plane of the labels and the frictional heat increases the temperature enough to melt the labels. The interface of the labels is designed to concentrate the melting process. The ultrasonic energy melts the point of contact between the labels, which creates a bond or weld when cool. Welding times can vary, but typically the welds are formed in approximately between 0.25 to 0.50 seconds. Depressing the dual safety switches 120, will return the air cylinder 112 back to the start or home position, retracts the head 104, and allows the welded labels to be removed from the anvil 102.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A sonic welding device for removably attaching a plurality of labels, comprising:
    an anvil having adjustable fencing;
    a head;
    a converter;
    a sonic horn;
    a power supply; and
    wherein the power supply delivers an electrical signal, the converter converts the electrical signal into a mechanical vibration, and the sonic horn applies the high frequency, mechanical vibration to the plurality of labels to be welded forming a plurality of welded labels; and
    where the weld can be adjusted for strength.

2. The sonic welding device of claim 1, wherein the device further comprises at least one safety switch which activates the device.

3. The sonic welding device of claim 1, further comprising an air cylinder.

4. The sonic welding device of claim 3, further comprising a solenoid valve for controlling the air cylinder.

5. The sonic welding device of claim 1, further comprising a nut pressure control.

6. The sonic welding device of claim 1, wherein strength of the welding is such that the top and the bottom label can be torn off without destroying the other labels.

7. The sonic welding device of claim 1, wherein at least a portion of the fencing is adjustable.

8. The sonic welding device of claim 1, wherein the head is knurled or textured.

9. The sonic welding device of claim 1, wherein the converter and sonic horn are specifically tuned to resonate at the same ultrasonic frequency.

10. The sonic welding device of claim 1, wherein the ultrasonic frequency is in the range of 20-40 kHz.

11. A sonic welding device for removably attaching a plurality of labels, comprising:
    an anvil, that has adjustable fencing;
    a head;
    a converter;
    a sonic horn; that utilizes ultrasonic power to apply the mechanical vibration;
    a power supply for delivering an electrical signal; and
    wherein the converter converts the electrical signal into a high frequency, mechanical vibration, and the sonic horn applies the high frequency, mechanical vibration to the plurality of labels forming a plurality of welded labels such that labels can be manually pulled or stripped away from a stack without destroying other labels of the stack or product.

* * * * *